United States Patent [19]

Bacon

[11] Patent Number: 5,163,541
[45] Date of Patent: Nov. 17, 1992

[54] MECHANISM USEFUL AS A SLIP CLUTCH OR BRAKE

[76] Inventor: Philip Bacon, 330 Old Hill Rd., Hamden, Conn. 06514

[21] Appl. No.: 836,363

[22] Filed: Feb. 18, 1992

[51] Int. Cl.⁵ .............................................. F16D 11/00
[52] U.S. Cl. ........................................ 192/76; 192/65; 464/44
[58] Field of Search ................... 192/35, 56 R, 65, 75, 192/76; 464/42, 43, 44

[56] References Cited

U.S. PATENT DOCUMENTS

| | | | |
|---|---|---|---|
| 101,940 | 4/1870 | Tatham | 464/44 |
| 511,047 | 12/1893 | Gawron | 192/35 |
| 514,384 | 6/1894 | Sellon | 464/23 |
| 923,043 | 5/1909 | Gulick | 464/44 |
| 1,416,283 | 5/1922 | Gmeinder | 192/35 |
| 1,430,468 | 9/1922 | Peterson | 192/35 |
| 1,550,936 | 8/1925 | Veith | 464/42 X |
| 1,598,839 | 9/1926 | Wills | 188/180 |
| 1,808,700 | 6/1931 | Wendell | 188/130 |
| 1,833,681 | 11/1931 | Leinbach | 188/130 |
| 1,834,704 | 12/1931 | Harris | 188/130 |
| 2,075,991 | 4/1937 | Kessler | 267/205 |
| 2,175,382 | 10/1939 | Eason | 192/4 C |
| 2,224,143 | 6/1941 | Dowler | 92/161 |
| 2,308,966 | 1/1943 | Saurer | 188/130 |
| 2,744,597 | 5/1956 | Merritt | 192/35 |
| 2,763,141 | 9/1956 | Dodge | 464/31 |
| 2,861,462 | 11/1958 | Hussar | 74/423 |
| 2,974,503 | 3/1961 | Newton | 464/44 |
| 3,071,899 | 1/1963 | Hicks et al. | 51/128 |
| 3,388,607 | 6/1968 | Stober et al. | 74/191 |
| 3,451,514 | 6/1969 | Ristow | 192/56 R |
| 3,478,853 | 11/1969 | Kraeplin | 192/111 A |
| 3,539,043 | 11/1970 | Brochetti | 192/65 X |
| 3,822,768 | 7/1974 | Sebulke | 188/70 R |
| 3,866,726 | 2/1975 | Arenz | 192/6 R |
| 4,067,425 | 1/1978 | Soter | 192/91 A |
| 4,287,785 | 9/1981 | Hunt | 74/488 |
| 4,375,194 | 3/1983 | Rohrbach | 104/166 |
| 4,583,628 | 4/1986 | McCormick | 192/76 |
| 4,637,502 | 1/1987 | Mayr et al. | 192/56 R |
| 4,702,359 | 10/1987 | Menusco et al. | 192/56 R |
| 4,798,647 | 1/1989 | Haas | 156/414 |

Primary Examiner—Leslie A. Braun
Assistant Examiner—Nicholas Whitelaw
Attorney, Agent, or Firm—Robert H. Montgomery

[57] ABSTRACT

A mechanism useful as a clutch or brake comprising a housing member having a wall defining a bore, a friction material disposed against said wall in said bore, a driver member having inner and outer ends at least partially within said bore, the driver and housing having a longitudinal axis, the driver member having a plurality of angularly spaced triangular slots defined therein from the inner end thereof at an angle to the longitudinal axis, the slots defined by opposite surfaces, a shoe of generally triangular form in each of said slots, the shoes hvaing surfaces mating with the surfaces of a slot whereby the shoes are slidable on the slot surfaces, the shoes having an outer peripheral surfaces defined on a portion of a cylinder,
the shoe outer surfaces being in contact with the friction material, amd means for adjusting the position of the shoes in said slots whereby the outer peripheral surfaces of the shoes engage the friction material in predetermined frictional engagement.

18 Claims, 6 Drawing Sheets

MECHANISM USEFUL AS A SLIP CLUTCH OR BRAKE

FIELD OF THE INVENTION

This invention relates to mechanisms which may be useful as a clutch or a brake.

BACKGROUND OF THE INVENTION

Miniature brakes or clutches are well known in the art and may find particular use as a hinge to predetermine the force required to rotate one object with respect to another or may be utilized as a brake as between two relative rotative objects. Known examples of the prior art relating to miniature clutches or brakes are set forth in the information disclosure statement accompanying this application.

The present invention provides a miniature clutch having zero backlash which provides a large torque in a small sized mechanism.

An object of this invention is to provide a new and improved object useful as a miniature clutch or brake.

Another object of this invention is to provide a new and improved mechanism useful as a clutch or brake which provides a large torque with small sized mechanism.

A further object of this invention is to provide a new and improved miniature mechanism useful as a clutch or brake which provides a large torque for its size

SUMMARY OF THE INVENTION

Briefly stated, the invention in one form thereof comprises a mechanism useful as a miniature clutch or brake and includes a housing member having a wall defining a cylindrical bore, a friction material is disposed against said wall in the bore, a driver member having inner and outer ends is at least partially received within the bore, the driver member having a longitudinal axis and having a plurality of angularly spaced triangular slots defined therein from the inner end thereof at a predetermined range of angles to the longitudinal axis, the slots being defined by opposite surfaces and the intersection of extension of opposite surfaces defining an angle to the longitudinal axis of the driver, a shoe of generally triangular form is in each of the slots where the shoes have surfaces mating with the surfaces of a slot whereby the shoes are slidable on the slot surfaces, the shoes having an outer peripheral surfaces defined in a portion of a cylinder. The shoe outer surfaces being in contact with the friction material, and means for axially adjusting the position of the shoes in the slots whereby the outer peripheral surfaces of the shoes readily engage the friction material in predetermined frictional engagement.

The features of the invention which are believed to be novel are particularly pointed and distinctly claimed in the concluding portion of this specification. The invention, however, together with further objects and advantages thereof may best be appreciated by references to the following detailed description taken in conjunction with the drawings.

DETAILED DESCRIPTION OF PREFERRED EMBODIMENTS OF THE INVENTION

Figure 1:
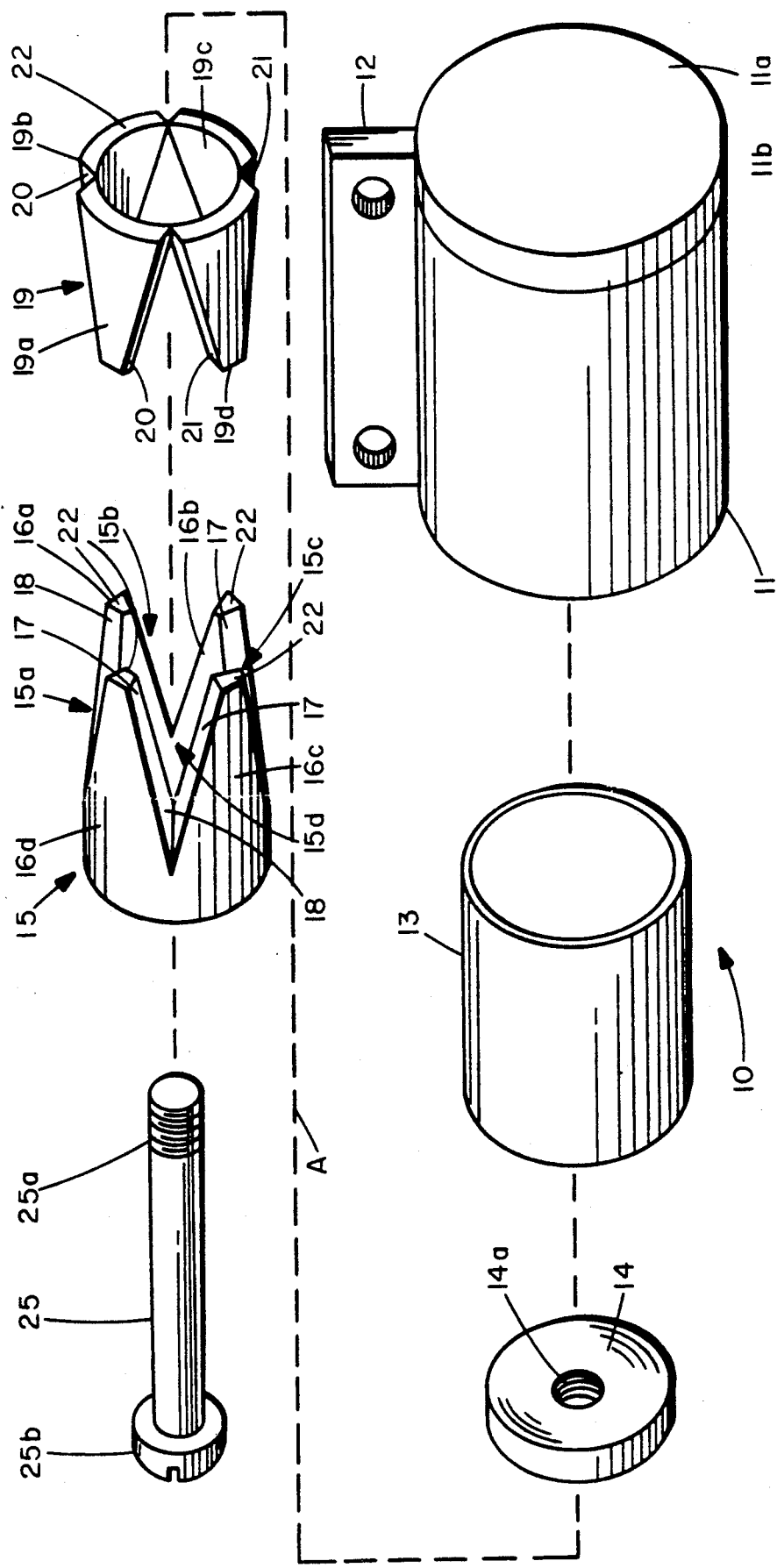
FIG. 1 is an isometric exploded view of a first mechanism embodying the invention seen along axis A.
Figures 3, 4:
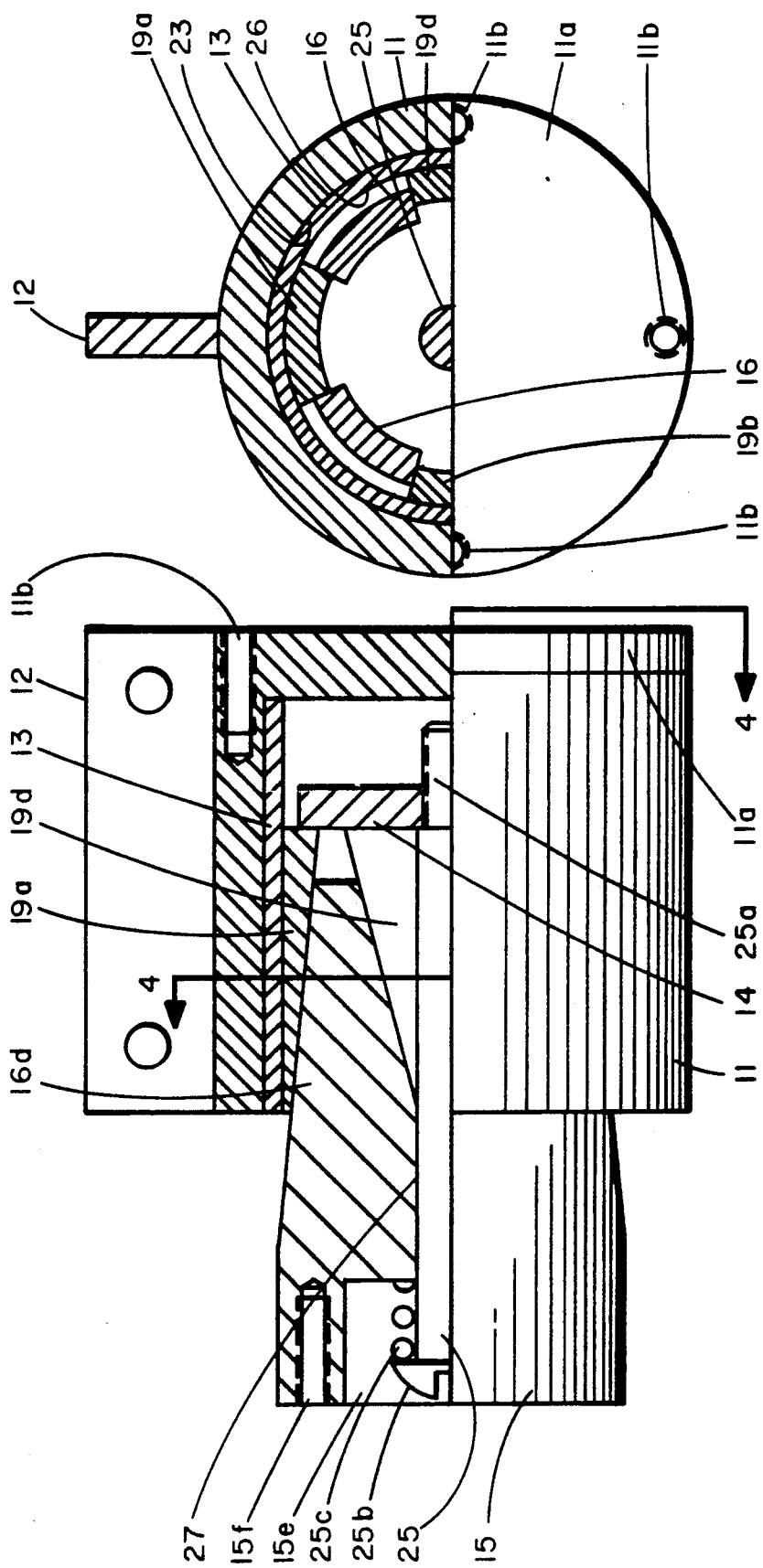
FIG. 3 is an assembled view of the exploded parts of FIG. 1 seen in longitudinal quarter sections)
FIG. 4 is a view seen in the planes of lines 4—4 of FIG. 3.

Reference is first made to FIG. 1 which exemplifies the various parts of a mechanism 10 embodying the invention and includes a cylindrical housing 11 having an end wall 11a which may be attached to the main body of housing 11 by screws 11b, shown in FIG. 3. The housing 11 may have a flange 12 thereon for attachment purposes to a another member. Received within the cylindrical bore of housing 11 is a friction material 13 in cylindrical form which may be either metallic or plastic depending upon the application.

Referring also to FIG. 3, in conjunction with FIG. 1, a thrust plate 14 having a central threaded bore 14a (FIG. 1) is also received in housing 11 as hereinafter more particularly described. The mechanism further comprises a driver member 15 having slots 15a-15b defined therein, the slots being generally triangular. The slots define four fingers 16a-16d all of which are identical and symmetrical around the axis A. Each of the fingers 16 define surfaces 17 and 18 on either edge of a finger 16 and on edges of adjacent fingers 16. The surfaces 17 and 18 are defined on planes which define an angle c/2 to the longitudinal axis A, as hereinafter described.

The slots are defined on an angle B (FIG. 2) to the longitudinal axis A of the mechanism which is preferably in the range of ten to sixty degrees.

Figure 2:
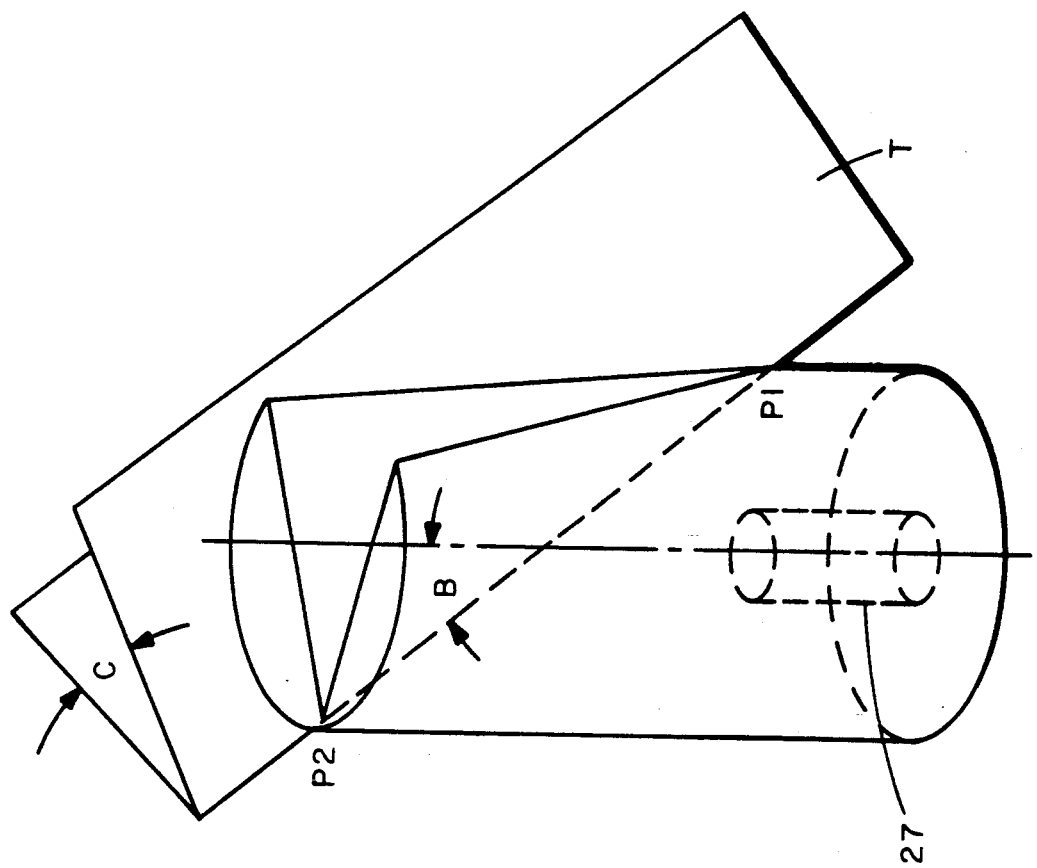
FIG. 2 is a schematic diagram helpful in explaining the manner in which a mechanism of FIG. 1 is forward.
Figure 8:
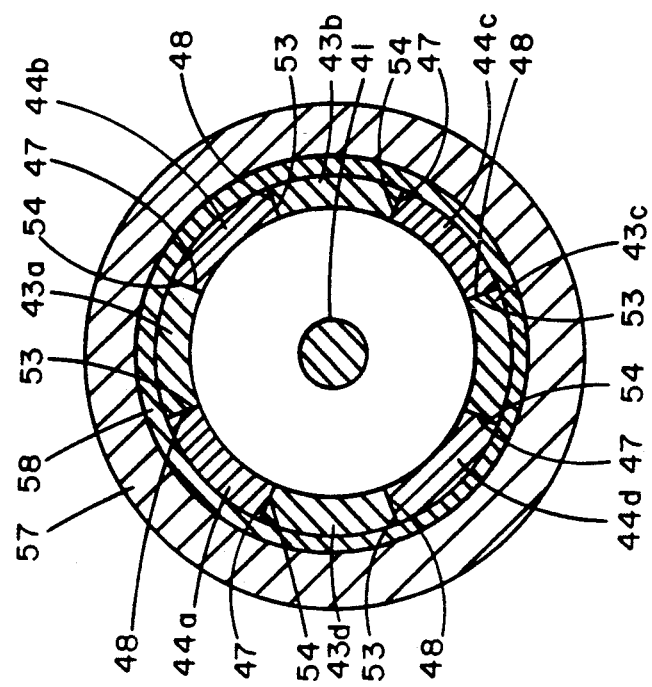
FIG. 8 is a section seen the plane of lines 8—8 of FIG. 7.

FIG. 2 is a diagram illustrating how driver 15 is formed. A length of cylindrical material is first cut to define a first slot by a cutting tool having a cutting angle c. The cutting tool T is exemplified in linear form as it moves from point P1 to point P2. This movement is at an angle B to the longitudinal axis of the cylindrical material. If the mechanism is to utilize four shoes 19a-19d four such cuts maybe made at right angles to each other to define the fingers 16 between the slots 15a-15d. The angle C of the cutting tool will define the angle of the surfaces to the longitudinal axis A. The cylindrical blank may then be drilled to provide an axial passage 27 for the drawbolt 25, or this maybe first accomplished. Additionally, the ends of the fingers may be cut perpendicular to axis A.

As previously mentioned all of the fingers 16 are symmetrical and the same, and the slots 15a-15d are all symmetrical and of the same dimensioning. The surfaces 17 and 18 of each slot are on an angle and plane will support wedges or shoes 19 therein. A plurality of shoes 19 shown as 19a-19d (all individual), each have surfaces 20 and 21 on planes at an angle to axis A which mate with surfaces 17 and 18 and may slide thereon. As the shoes move into the slots they will expand radially and engage in a predetermined degree of, frictional engagement with the surface 26 of the friction material 13 or the wall 23 of the bore if friction material 13 is not utilized. Each of the fingers 19a–19d have a rear surface 22 bearing on thrust plate 14.

A draw bolt 25 extends through a bore 27 in driver 15 and threadably extends into thrust plate 14 with its threaded end 25a engaging the threads 14a of thrust plate 14. Draw bolt 25 is biased by a spring 25c (FIG. 3) bearing on a wall of a recess 15e in driver 15 and the head 25b of the draw bolt. Driver 15 has threaded openings extending axially therein for attachment of a member to driver 15. Then the device attached to flange 12 and to the driver may be relatively rotated upon sufficient force to overcome the friction between the shoes 19a–19b and the friction material 13 or the wall of the housing bore.

The degree of friction or otherwise stated the torque is set by drawbolt 25 drawing the shoes into slots 15a–15d and thereby expanding the radial diametrical across the outer periphery of the shoes. The outer periphery of the shoes 19a–19d are formed on a portion of a cylinder.

Through the use of the drawbolt the torque necessary to rotate driver 15 with respect to housing 11 or vice versa is predetermined and after such torque is exerted to rotate the two members (not shown) to a given angular position, the mechanism acts a brake in holding these members in their relatively rotated position.

The driver 15 is formed from a section of cylindrical stock and the outer surfaces thereon are cylindrical, and a bore is drilled therein to receive drawbolt 25. The shoes 19a–19b are cut from a piece of cylindrical tube stock in generally triangular shape with the side surfaces 20 and 21 thereof cut at an angle and plane complimentary to the angle of the surfaces 17 and 18 of the slots 15a–15b of driver so as the shoes are drawn toward driver 15 they will move both linearly on the surface to 17 and 18 and also radially rise or expand.

Reference is now made to FIG. 4 which shows the shoes 19a, 19b, and 19d in contact with friction material 13 and above the fingers 16 at the section taken. The degree of radial separation at the plane of line 4 has been exaggerated for purposes of clarity of illustration. The shoes are in contact with the friction material 13 with an outward radial force dependent on the degree of tightening of drawbolt 25.

The frictional material 13 may be in the form of a cylinder or may be a rectangular section formed into a cylinder. The friction material is selected for torque characteristics. With respect to the material of the housing and the material of the shoes. In the alternative the friction material may be eliminated leaving shoe to housing bore frictional contact.

As drawbolt 25 is tightened in thrust plate 14, equal and opposite axial forces are generated on driver 15 and shoes 19a–19d. This causes the shoes to move axially on surfaces 17 and 18 and also radially outwardly to provide a greater degree of frictional engagement with the friction material 13 and bore 27 in housing 11.

The degree of frictional engagement of the shoes with the friction material and ultimately bore 27 is determined by the relative positioning or tightening of drawbolt 25 relative to thrust plate 14, and the resultant outward movement, and also the area of the outer peripheral surfaces of the shoes.

While the invention has thus far been disclosed as utilizing four shoes, an embodiment of the invention may have only two diametrically opposed shoes. Also, the invention may be practiced with three shoes or more than four.

The invention may also be practiced in embodiments where the shoes are in multiple to provide a greater torgue.

Figure 5:
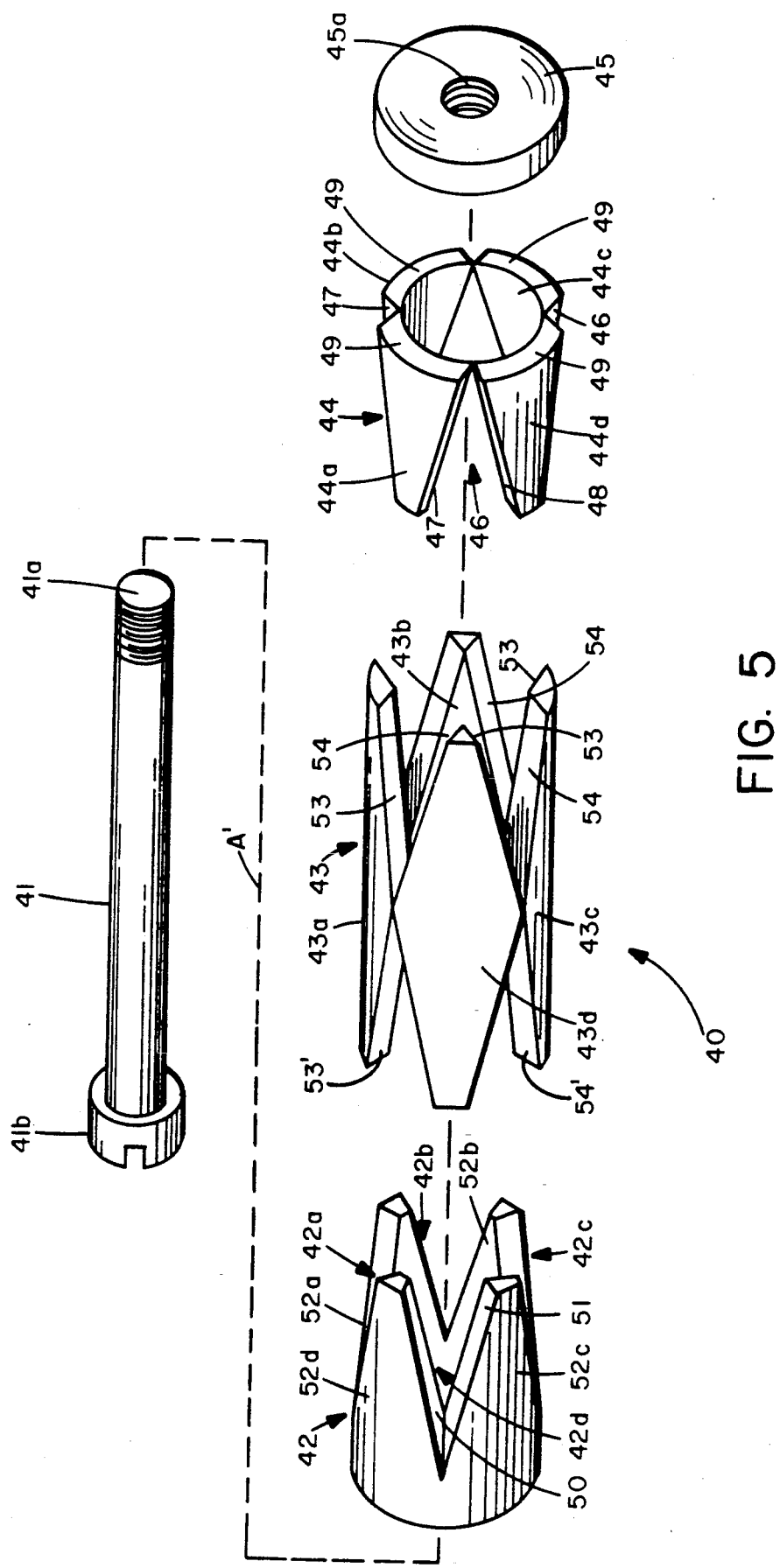
FIG. 5 is a an exploded isometric view of a further mechanism embodying the invention seen along an axis $A^1$.

Reference is now made to FIGS. 5–8 which show another embodiment of the invention using a set of four double shoes 43 and a set of four single shoes 44. FIG. 5, is an exploded isometric view of this mechanism with the exterior housing removed. The overall mechanism 40 comprises a draw bolt 41 with the threaded end 41a and a head 41b. The draw bolt 41 extends through a driver 42 having slots 42a–42d defined therein as previously described in conjunction with the first embodiment. The driver operates with a set of four bi-directional set of shoes 43, 43a–43d, all on an axis $A^1$.

Also provided is a set 44 of four single shoes 44 identified as shoes 44a–44d which will cooperate with the bi-directionally extending shoes 43. The draw bolt 41 extends through driver 42, the set of shoes 43, the set of shoes 44 and is threadably received in the threaded axial bore 45a of a thrust plate 45.

The slots 42a–42d on driver 42 are defined as previously described with each having a pair of adjacent surfaces 50 and 51 on planes defining an angle to the axis $A^1$.

The shoes 44a–44d define triangular spaces 46 therebetween, and have surfaces 47 and 48 which mate with surfaces of shoes 43 as hereinafter described. The surfaces 47 and 48 are defined on planes which are angled to axis $A^1$. The shoes 44a–44d have rear surfaces 49 which are engaged by thrust plate 45.

The double shoes 43a–43d have surfaces 53 and 54 at one end thereof and $53^1$ and $54^1$ at the other end thereof. The surfaces 53, 54 and $53^1$, $54^1$ are defined on planes at an angle to axis A1. The surfaces 53′ and 54′ are complimentary to surfaces 50 and 51 of the slots of driver 42. Surfaces 53 and 54 are complimentary to and in contact with surfaces 47 and 48 of shoes 44a–44d.

Figure 6:
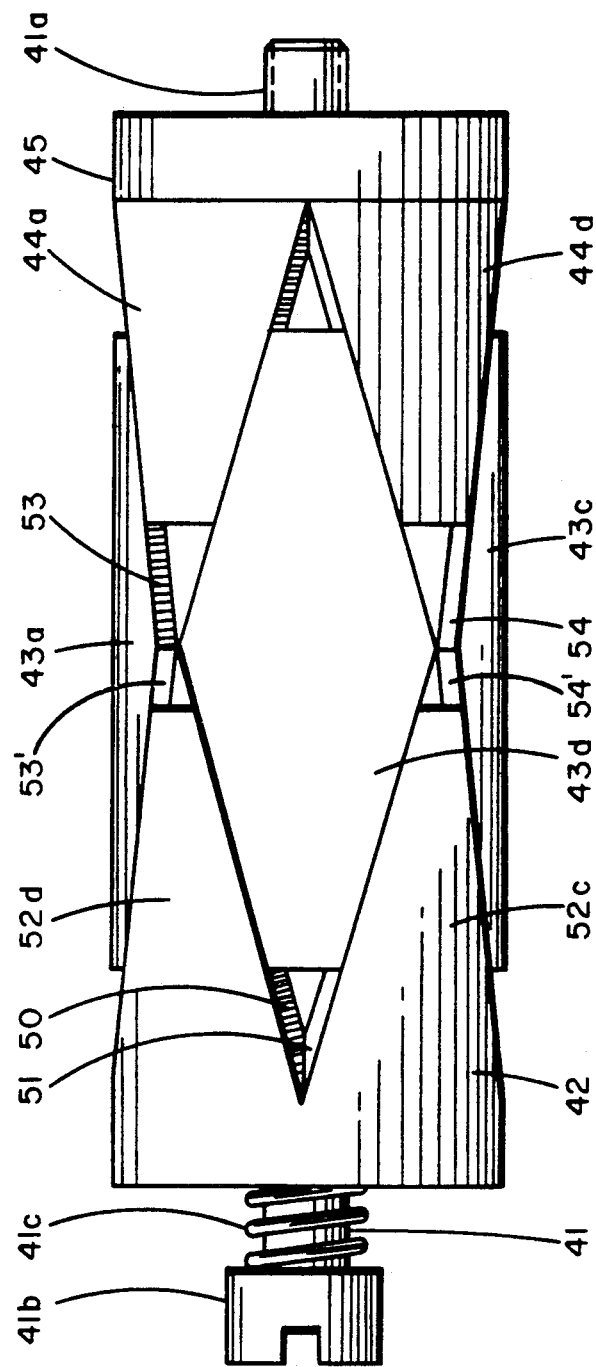
FIG. 6 in an assembled view of the exploded parts of FIG. 4 with the housing removed.
Figure 7:
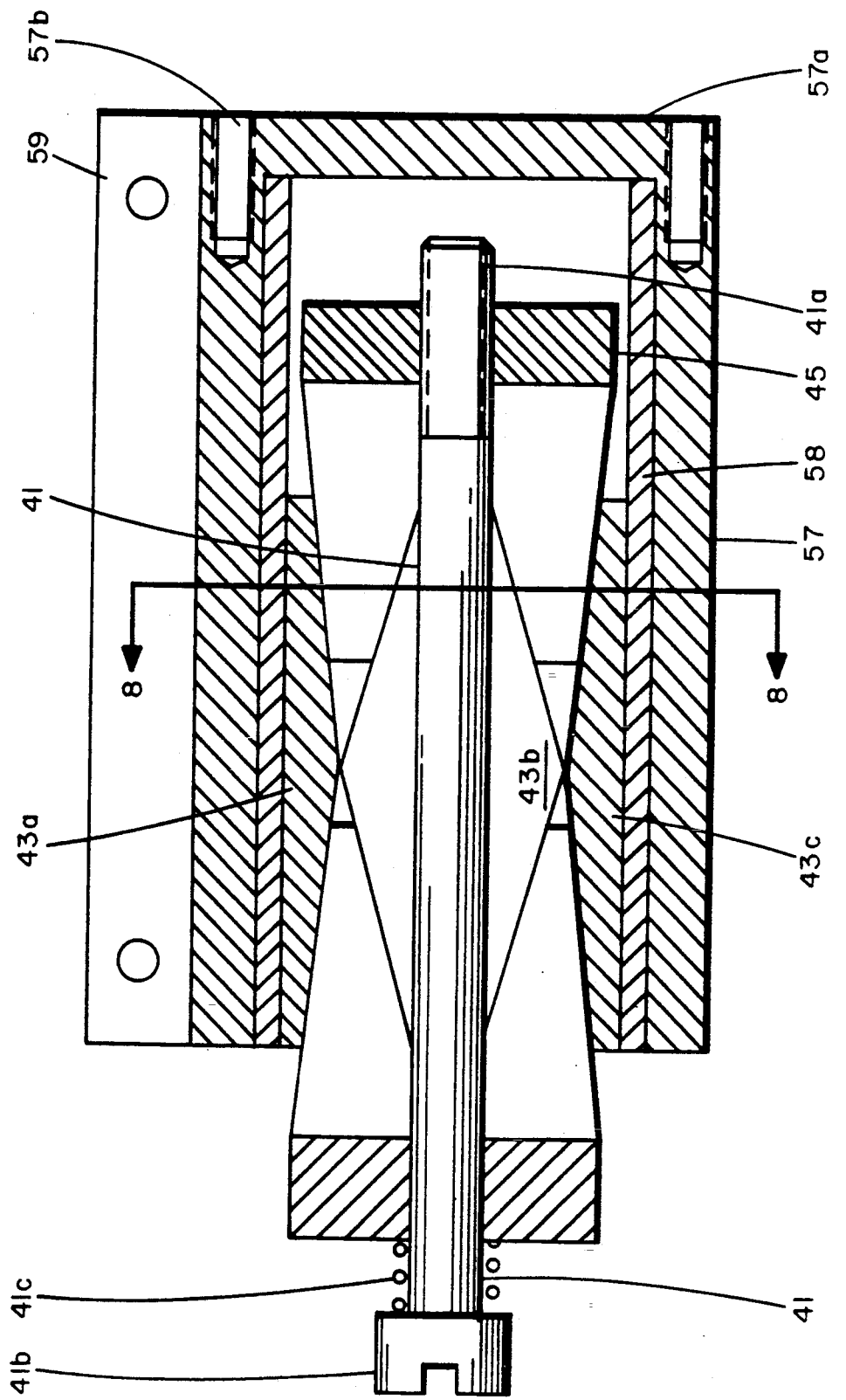
FIG. 7 is an assembled view of the exploded parts of FIG. 4 seen in longitudinal half sections.

FIG. 6 illustrates the elements of FIG. 5 in assembled form, FIG. 7 is a longitudinal half section showing the assembled driver and shoes within housing member 57 having an end wall 57a attached to the cylindrical housing by screws 57b. A friction material 58 in excluded form is received within the cylindrical bore of housing member 58. A mounting flange 59 may be attached to housing member 57 for mounting purposes.

Considering now the operation of the mechanism of FIGS. 5–8, and the predetermination of the torque, as draw bolt 41 is turned to draw up thrust plate 45, driver 42 and thrust plate 45 move relatively toward each other. This produces sliding movement of surfaces 53′ and 54′ of shoes 43a–43d on surfaces 51 and 50 of driver fingers 52a–52d and resultant radially outward movement of shoes 43a–43d and increasing frictional engagement with friction material 58.

Simultaneously, surfaces 47 and 48 of shoes 44a–44d slide on surfaces 53 and 54 of double shoes 43a–43d and move radially outwardly to engage friction material 58. In this manner the frictional engagement between the shoes and the housing is predetermined.

The number of double shoes maybe multiplied as desired depending upon the torgue or braking forces desired.

It may thus be seen that the objects of the invention set forth, as well as those made apparent from the foregoing description, are efficiently attained. While preferred embodiments of the invention has been set forth for purposes of disclosure, modification to the disclosed embodiment of the invention, as well as other embodiments thereof, may occur to those skilled in the art. Accordingly, the appended claims are intended to cover all embodiments of the invention and modifications to the disclosed embodiments which do not depart from the spirit and scope of the invention.

What is claimed is:

1. A mechanism comprising a housing member having a wall defining a cylindrical bore, a driver member having inner and outer ends at least partially received within said bore, said driver member having a longitudinal axis, said driver member having a plurality of angularly spaced triangular slots defined therein from the inner end thereof at an angle to said longitudinal axis, said slots defined by opposite surfaces, said opposite surfaces defining an angle perpendicular to said longitudinal axis.

a plurality of shoes of generally triangular form one of said plurality of shoes in each of said slots, said shoes having surfaces mating with the surfaces of each slot whereby said shoes are slidable on said slot surfaces, said shoes having outer peripheral surfaces defined on a portion of a cylinder, said shoe outer surfaces being in contact with the wall of said bore, and means for axially adjusting the position of said shoes in said slots whereby the outer peripheral surfaces of said shoes radially engage said wall of said bore in predetermined frictional engagement.

2. The mechanism of claim 1 wherein a sleeve of friction material is disposed in said bore between said wall and said shoes.

3. The mechanism of claim 1 wherein the means for axially adjusting the position of said shoes comprises a thrust plate at the inner end of said driver bearing on said shoes, said shoes extending beyond the inner end of said driver.

4. The mechanism of claim 1 wherein said slots in said driver are defined at an angle of 10°-60° to said longitudinal axis.

5. The mechanism of claim 1 wherein said means for axially adjusting comprises a draw bolt extending through said driver to a thrust plate engaging the ends of said shoes.

6. The mechanism of claim 1 where said surfaces are defined on an acute angle to said longitudinal axis.

7. A mechanism comprising a housing member defining a cylindrical bore and having a longitudinal axis, a driver member having inner and outer ends at least partially received within said bore, said driver member having a longitudinal axis coincident with the axis of said bore, said driver member having a plurality of angularly spaced triangular slots defined therein from the inner end thereof at an angle to said longitudinal axis, being defined by intermediate fingers, said fingers having surfaces defined thereon, a first plurality of bi-directionally extending shoes each having one end extending into each of said slots, each shoe having surfaces mating with the surfaces of respective fingers whereby said shoes are slideable on said finger surfaces, said shoes having an outer peripheral surface defined on a portion of a cylinder adapted to frictionally engage the wall of said bore said first plurality of bi-directionally extending shoes defining generally triangular spaces therebetween and surfaces on the end opposite the end contacting said driver surfaces, a second plurality of shoes of generally triangular shape having surfaces mating with the surfaces of said bidirectional shoes whereby each second shoe may slide relative to each said bi-directional shoe, said second plurality of shoes having an outer peripheral surface defined on a portion of a cylinder adapted to frictionally engage the wall of said bore and means for axially adjusting the longitudinal position of said first and second plurality of shoes with respect to said driver whereby the outer peripheral surfaces of said shoes radially engage said wall of said bore in predetermined frictional engagement.

8. The mechanism of claim 7 wherein a sleeve of friction material is disposed within said bore between said wall and said bidirectionally extending shoes and said second shoes.

9. The mechanism of claim 7 wherein the means for axially adjusting the longitudinal position of said first and second shoes comprises a thrust plate at the inner end of said driver bearing on said second set of shoes.

10. The mechanism of claim 7 wherein said slots in said driver are defined at an angle of 10°-60° to said longitudinal axis.

11. The mechanism of claim 7 wherein said means for axially adjusting comprises a draw bolt extending through said driver, said first and second shoes to a thrust plate engaging the end of said second shoes.

12. A mechanism comprising a housing member having a wall defining a cylindrical bore having first longitudinal axis, a driver member having inner and outer ends at least partially received within said bore, said driver member having a longitudinal axis coincident with said first longitudinal axis, said driver member having a plurality of angularly spaced triangular slots defined therein from the inner end thereof at an angle to said longitudinal axes, said slots defined by opposite surfaces on planes angles to said axes, said opposite surfaces defining an angle perpendicular to said longitudinal axis.

a plurality of shoes of generally triangular form, one in each of said slots, each shoe having planar surfaces mating with the surfaces of each respective slot whereby said shoes are slidable on said slot surface, said shoes having outer peripheral surfaces defined on a portion of a cylinder, said shoe outer surfaces being arranged to contact with the wall of said bore, and;

means for axially adjusting the longitudinal position of said shoes in said slots whereby the outer peripheral surfaces of said shoes radially engage said wall of said bore in predetermined frictional engagement.

13. The mechanism of claim 12 wherein a sleeve of friction material is disposed in said bore between said wall and said shoes.

14. The mechanism of claim 2 wherein said shoes engage the wall of said bore through said friction material.

15. The mechanism of claim 2 wherein the means for axially adjusting the position of said shoes comprises a thrust plate at the inner end of said driver bearing on said shoes, said shoes extending beyond the inner end of said driver.

16. The mechanism of claim 2 wherein said slots in said driver are defined at an angle of 10°-60° to said longitudinal axis.

17. The mechanism of claim 2 wherein said means for axially adjusting comprises a draw bolt extending through said driver to a thrust plate engaging the ends of said shoes.

18. The mechanism of claim 2 where said surfaces are defined on an acute angle to said longitudinal axis.

* * * * *

UNITED STATES PATENT AND TRADEMARK OFFICE
CERTIFICATE OF CORRECTION

PATENT NO. : 5,163,541
DATED : November 17, 1992
INVENTOR(S) : Philip Bacon

It is certified that error appears in the above-identified patent and that said Letters Patent is hereby corrected as shown below:

Claim 12, column 6, line 51 "surface" shoud be "surfaces".

Signed and Sealed this

Twenty-sixth Day of October, 1993

Attest:

BRUCE LEHMAN

Attesting Officer    Commissioner of Patents and Trademarks